(12) United States Patent
Lerios

(10) Patent No.: US 9,361,659 B2
(45) Date of Patent: Jun. 7, 2016

(54) SYSTEMS AND METHODS FOR OPTIMIZING ORDER OF IMAGE TRANSFORMATIONS

(71) Applicant: Apostolos Lerios, Austin, TX (US)

(72) Inventor: Apostolos Lerios, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 403 days.

(21) Appl. No.: 13/677,206

(22) Filed: Nov. 14, 2012

(65) Prior Publication Data

US 2014/0132610 A1     May 15, 2014

(51) Int. Cl.
*G06T 1/00* (2006.01)
*G06T 15/00* (2011.01)
*G06F 9/38* (2006.01)

(52) U.S. Cl.
CPC ............... *G06T 1/00* (2013.01); *G06F 9/3851* (2013.01)

(58) Field of Classification Search
CPC ................. G06F 15/00; G06T 1/00–1/0092
USPC ................................................ 345/501, 522
See application file for complete search history.

(56) References Cited

U.S. PATENT DOCUMENTS

| 7,979,860 B2* | 7/2011 | Hill ............................... 718/102 |
| 8,509,569 B2* | 8/2013 | Weiss et al. ................... 382/302 |
| 2011/0234756 A1* | 9/2011 | Adler ....................... G06T 5/002 348/46 |

* cited by examiner

*Primary Examiner* — Jacinta M Crawford
(74) *Attorney, Agent, or Firm* — Baker Botts L.L.P.

(57) ABSTRACT

Techniques to optimize the ordering of image transformations. Ordering cost functions are applied to possible transformation orderings of image transformations of a user-selected transformation ordering. Computing costs are calculated based on the cost functions. An optimal transformation ordering is selected from the possible transformation orderings based on the computing costs. In one embodiment, a first transformation and a second transformation of the user-selected transformation ordering are swapped. In one embodiment, at least one of the ordering cost functions is based on a per-pixel cost value. In one embodiment, a fidelity loss threshold representing an acceptable level of difference between a first image resulting from the optimal transformation ordering and a second image resulting from the user-selected transformation ordering is determined. In one embodiment, selection of the optimal ordering transformation is based on satisfaction of the fidelity loss threshold.

51 Claims, 7 Drawing Sheets

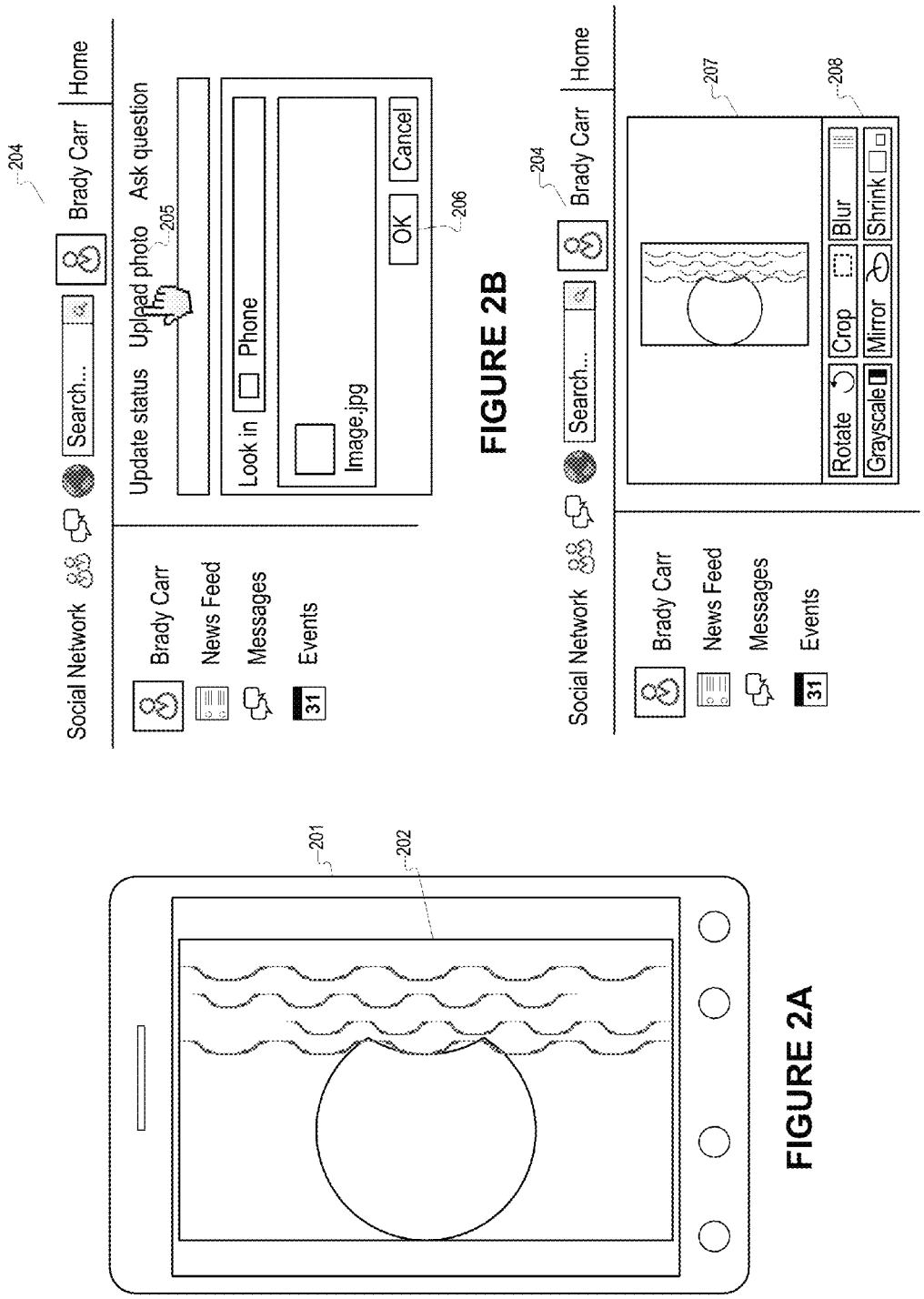

SYSTEMS AND METHODS FOR OPTIMIZING ORDER OF IMAGE TRANSFORMATIONS

FIELD OF THE INVENTION

The present invention relates to the field of social networking. More particularly, the present invention provides a technique for optimizing the order of transformations applied to an image within a social networking system.

BACKGROUND

Internet social networks have become a significant phenomenon. Social networks allow an Internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Information on a user's profile is often only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include digital media such as images. Users may assemble albums that include photographs and other content and share their albums with their friends. This functionality may include the ability to edit media uploaded to a social network. Users may apply certain photo editing techniques and transformations that are provided as part of a suite of graphics editing tools within a social networking user interface. Because of their collaborative nature, social networks have now become a popular means by which many people share photos and other media content.

SUMMARY

To allow for efficient processing of image edits, embodiments of the invention include systems, methods, and computer readable media to optimize the ordering of image transformations. Ordering cost functions are applied to possible transformation orderings of image transformations of a user-selected transformation ordering. Computing costs are calculated based on the cost functions. An optimal transformation ordering is selected from the possible transformation orderings based on the computing costs.

In one embodiment, a first transformation and a second transformation of the user-selected transformation ordering are swapped. In another embodiment, at least one of a first parameter associated with the first transformation and a second parameter associated with the second transformation is adjusted. In another embodiment, the adjusting the at least one of the first parameter associated with the first transformation and the second parameter associated with the second transformation is based on at least one heuristic. In another embodiment, the swapping the first transformation and the second transformation of the user-selected transformation ordering comprises substituting an alternate technique for at least one of the first transformation and the second transformation.

In one embodiment, at least one of the ordering cost functions is based on at least one of a per-pixel cost value and a function form. In another embodiment, at least one of the per-pixel cost value and the function form is based on hardware capabilities. In another embodiment, the ordering cost functions include transformation cost functions. In another embodiment, collapsing transformations from the image transformations are identified. In another embodiment, combining transformations from the image transformations are identified.

In one embodiment, a cost savings feature is identified based on parameters associated with at least one of the image transformations, wherein at least one of the ordering cost functions is based on the cost savings feature. In another embodiment, the cost savings feature is based on use of a technique for executing at least one of the image transformations. In another embodiment, the cost savings feature is based on use of a hardware component.

In one embodiment, a fidelity loss threshold representing an acceptable level of difference between a first image resulting from the optimal transformation ordering and a second image resulting from the user-selected transformation ordering is determined. In another embodiment, the selecting the optimal ordering transformation is based on satisfaction of the fidelity loss threshold.

In one embodiment, the image transformations comprise at least one of a crop, a rotate, and a shrink. In another embodiment, the calculating computing costs comprises calculating at least one sequence cost for at least one sequence of the possible transformation orderings and storing the at least one sequence cost. In another embodiment, at least one constraint associated with at least one of the image transformations of the user-selected transformation ordering is identified, wherein the selecting an optimal transformation ordering is based on the at least one constraint.

Many other features and embodiments of the invention will be apparent from the accompanying drawings and from the following detailed description.

BRIEF DESCRIPTION OF THE DRAWINGS

FIG. 2A illustrates an image captured on a mobile device by a user of a social networking system in accordance with an embodiment of the invention.

FIG. 2B illustrates the user accessing a user interface to upload the image to the social networking system in accordance with an embodiment of the invention.

FIG. 2C illustrates the image uploaded to the social networking system and displayed within a user interface in accordance with an embodiment of the invention.

Figure 1:
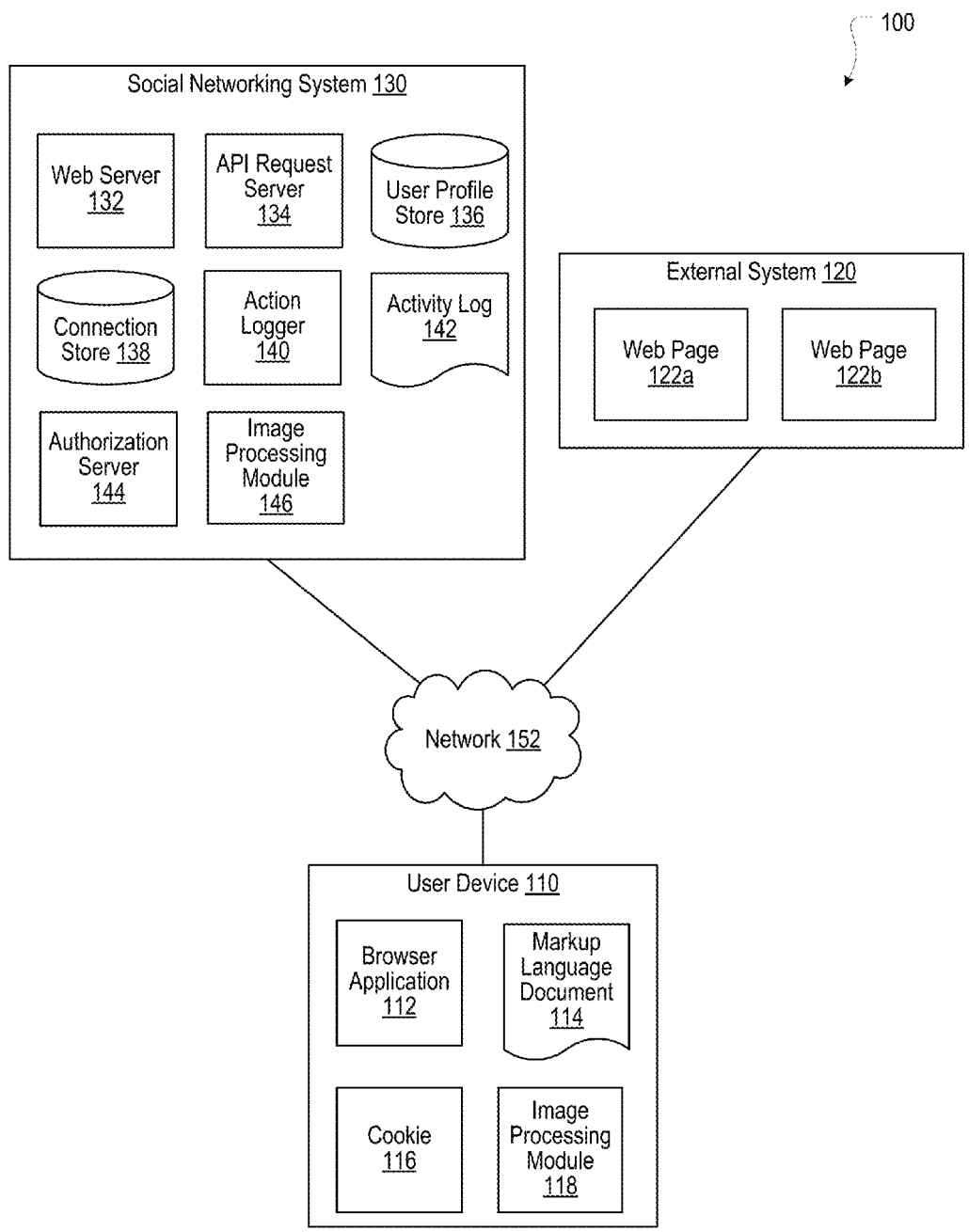
FIG. 1 illustrates a system for optimizing the order of image transformations within a social network in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for optimizing the order of transformations applied to an image within a social network in accordance with an embodiment of the invention. The system 100 includes one or more user devices 110, one or more external systems 120, the social networking system 130, and a network 152. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 152. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 152. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 152, which may comprise any combination of local area and/or wide area networks, using wired and/or wireless communication systems.

In one embodiment, the network 152 uses standard communications technologies and protocols. Thus, the network 152 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 152 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 152 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110. In one embodiment, the user device 110 also includes an image processing module 118.

The external system 120 includes one or more web servers that include one or more web pages 122a, 122b, which are communicated to the user device 110 using the network 152. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 152.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and an image processing module 146. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user profile store 136 maintains information about user accounts, including biographic, demographic, and other types of descriptive information, such as work experience, educational history, hobbies or preferences, location, and the like that has been declared by users or inferred by the social networking system 130. This information is stored in the user profile store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user profile store 136 and the connection store 138 store instances of the corresponding type of objects maintained by the social networking system 130. Each object type has information fields that are suitable for storing information appropriate to the type of object. For example, the user profile store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user profile store 136 and the connection store 138 may be implemented as a federated database.

Data stored in the connection store 138, the user profile store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user profile store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 152. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 152, and the API request server 134 receives the API request. The API request server 134 processes the request by calling an API associated with the API request to generate an appropriate response, which the API request server 134 communicates to the external system 120 via the network 152. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

According to an embodiment of the invention, the user device 110 may receive an image from the social networking system 130. A user of the user device 110 may select transformations to be applied to the image. In an embodiment, the transformations may be applied by the image processing module 118 of the user device 110. In another embodiment, the image and the transformations may be provided to the social networking system 130, where they may be applied by the image processing module 146. The transformations may be applied in a manner that minimizes computing costs, as described further below.

Optimizing Order of Image Transformations

Users may take advantage of the collaborative features and functionality of the social networking system 130 to upload and share digital images. A user of the social networking system 130 may upload a profile picture that features prominently on her profile and identifies her to friends and other users. A user may also upload a cover image that may be displayed as a banner across the top of the user's profile. In addition to a profile picture and a cover image, a user may also upload images to share with other users, such as photographs of an event, artwork, professional photography portfolios, photos from nature, or any other type of digital images. With the advent of mobile devices that include built-in cameras and connect to wireless data networks, photo sharing has become an increasingly prominent feature of social networking systems.

Users of the social networking system 130 may wish to edit and modify images uploaded to the social networking system 130. Using a photo editing application, the user may modify an image by selecting transformations to be applied to the original image. Transformations may include discrete operations such as cropping, shrinking, rotating, or any other modification of the original image. A transformation may optionally be associated with a set of parameters, such as a range of pixels, dimensions, a shrink ratio, a rotation angle, or any other values that specify additional information about the transformation.

Transformations may be applied to images stored within the social networking system 130 in a number of ways. It may be possible to download an image from the social networking system 130 to a user device 110, open the image within a separate photo editing tool on the user device 110, select transformations to be applied to the image using the photo editing tool, apply the selected transformations resulting in an altered image, and re-upload the altered image back from the user device 110 to the social networking system 130. However, editing images using a separate photo editing tool may be inconvenient and inefficient. The user may be forced to use multiple applications on the user device 110 to edit an image stored on the social networking system 130. In addition, use of a separate photo editing tool may result in an inefficient use of the resources of the social networking system 130. If the user uploads the altered image to the social networking system 130 as a new image, both the original image and the altered image may be stored within the social networking system 130 as two distinct, unassociated images.

To optimize efficiency and convenience, the social networking system 130 may provide users with functionality for editing images within a user interface of the social networking system 130. By editing an image within the user interface of the social networking system 130, a user may edit the image without having to save it to a user device 110, perform the edits using a separate photo editing utility on the user device 110, and re-upload the altered image to the social networking system 130. The user interface may be provided within an online portal, such as a website, or a dedicated social networking application on the user device 110.

Figure 2D:
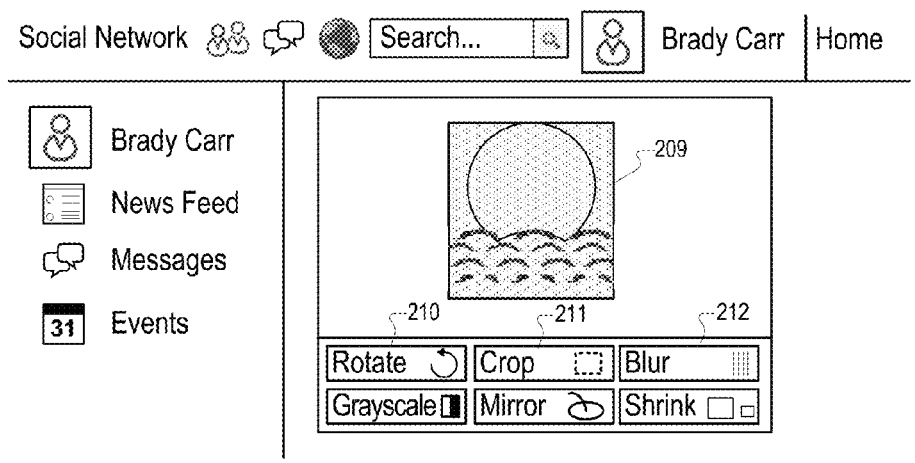
FIG. 2D illustrates the user applying a number of transformations to the image, resulting in an altered image in accordance with an embodiment of the invention.

FIGS. 2A-2D illustrate photo editing functionality of the social networking system 130 according to an embodiment of the invention. In FIG. 2A, a user (e.g., Brady Carr) has taken a photograph 202 of a sunset with the built-in camera of his mobile device 201. The mobile device 201 may be a smartphone, a tablet device, a laptop computer with a built-in camera, or other user device 110. Alternatively, the photograph 202 may be taken with a dedicated camera (not pictured) and transferred to a user device 110 such as a laptop computer or a desktop computer. In FIG. 2B, Brady Carr has accessed a user interface 204 to upload the photograph 202 to the social networking system 130. Brady Carr selects an 'upload' option 205 within the user interface 204 that prompts him to browse to the location of the photograph on the local storage of his mobile device 201. He locates the photograph 202 and selects the 'OK' option 206.

In FIG. 2C, the photograph 202 has been uploaded to the social networking system 130 and is displayed within the user interface 204. The user interface 204 in FIG. 2C includes a photo editing utility 207 with an options toolbar 208 to allow a user to select transformations to be applied to an image. In an embodiment, a user may select other transformations in addition to those shown. In FIG. 2D, Brady Carr, using the photo editing utility 207 and the options toolbar 208, has selected a number of transformations to be applied to the photograph 202, resulting in an altered photograph 209. These transformations include a 90 degree rotation, indicated by a 'rotate' button 210, a crop, indicated by a 'crop' button 211, and a blur, indicated by a 'blur' button 212. Brady Carr may finalize and submit these transformations by selecting a save option. The altered photograph 209 may be viewed by a user of the social networking system 130 on a user device 110.

When a user edits an image, he may select transformations in an order that appears most intuitive to him. For example, Brady Carr may rotate the photograph 202 prior to cropping it, because he may find it difficult to determine which portion of the photograph 202 to crop out while viewing it sideways. However, the order of transformations that appears most intuitive to the user may not be the same as the order that optimizes the computing costs of applying the transformations. Computing costs may include processing time, computing resources, data storage requirements, or any other expenditure that a computing task may require. The computing costs of applying a transformation may be proportionate to the size or other characteristics of the image to which the transformation is applied. In the example shown in FIGS. 2A-2D, if the rotate transformation is applied prior to the crop transformation, the social networking system 130 may incur a cost to rotate pixels that will eventually be removed from the image. It may be less costly to crop the image prior to rotating it, since the rotate transformation would not be applied to pixels that have been removed from the image.

Many different types of transformations may be available to apply to an image, and the transformations selected by a user may be numerous and complex. It may not be possible for the social networking system 130 to determine an optimal ordering in which to apply the transformations on an ad-hoc basis. The social networking system 130 may need to determine an optimal position of a particular transformation within a transformation ordering based on the parameters associated with the transformation, the position of the transformation in the user-selected ordering, and the other transformations that precede and follow the transformation in the user-selected ordering. In the example of FIGS. 2A-2D, the social networking system 130 may determine that the rotate transformation should not be applied first because the user has also selected a crop transformation. However, if Brady Carr selects another transformation instead of the crop transformation, then it may be less costly to apply the rotate transformation first. Thus, in an embodiment of the invention, the optimal transformation ordering may be determined using ordering cost functions.

A process for determining an optimal transformation ordering may itself incur computing costs in addition to the overall computing costs incurred in applying the set of transformations. If the overall computing costs of applying the transformations according to the user-selected ordering are less than the total computing costs of determining an optimal ordering and applying the transformations according to the optimal ordering, then the process for determining the optimal ordering may have limited utility. According to an embodiment of the invention, an ordering cost function may be utilized to determine the cost of a transformation ordering. The ordering cost function may determine the cost of a transformation ordering without having to apply the transformations according to the ordering. Using an ordering cost function avoids the need to determine an optimal ordering by applying the transformations according to different orderings on a trial-and-error basis.

According to an embodiment of the invention, to determine an optimal transformation ordering, an ordering cost function may need to be determined for every possible ordering of the transformations selected by the user. The possible orderings of a set of transformations may refer to all possible permutations of the transformations. In an embodiment, the possible orderings may be subject to constraints on the sequences in which some transformations may be applied. According to an embodiment, some types of transformations may be restricted from being applied immediately before or immediately after certain other types of transformations. The restrictions may be enforced on the user using, for example, the user interface 204. According to an embodiment, the position of a transformation in a user-selected ordering may be fixed. A fixed-position transformation may become a stationary point in each of the re-orderings, which may include re-ordered sequences of transformations surrounding the stationary point. Fixed-position transformations and other constraints that restrict re-ordering may need to be accounted for in determining possible re-orderings of transformations.

Re-ordering of transformations may cause a loss of fidelity between an image produced by applying transformations according to a user-selected transformation ordering and an image produced by applying transformations according to an alternate transformation ordering. Loss of fidelity may refer to the differences between the two images, such as the introduction of artifacts, color discrepancies, shifts in the relative location of some pixels, or any other effect. Some amount of fidelity loss may be acceptable. In an embodiment of the invention, the fidelity loss may need to be confined to specific regions of the image or kept within a threshold.

Each transformation in an ordering may be applied to an input image and result in an output image. The first transformation in an ordering may be applied to an original image. A subsequent transformation may be applied to the output image produced by a preceding transformation. Changing the ordering of the transformations may also change the output image produced by each transformation, resulting in a loss of fidelity. For example, if a user has selected a shrink transformation followed by a crop transformation, the shrink transformation and the crop transformation in the user-selected transformation ordering may be swapped in an optimal transformation ordering so that the crop transformation is applied before the shrink transformation. Swapping the shrink transformation and the crop transformation in the user-selected ordering eliminates the computational costs of shrinking pixels that will be eventually be removed from the image. However, the image produced by the optimal transformation ordering may be slightly different from the image produced by the user-selected transformation ordering. In an embodiment, a shrink transformation may be applied to an input image by computing each pixel in the output image as a composite of several pixels in the input image. In the user-selected transformation ordering, the shrink transformation is applied to the original image. However, in the optimal transformation ordering, the shrink transformation is applied to the output image that results from the crop transformation, which has fewer pixels than the original image. Consequently, pixels in the output image resulting from the shrink transformation in the optimal transformation ordering are determined as a composite of fewer pixels than pixels in the output image resulting from the shrink transformation in the user-selected transformation ordering. This may cause differences between pixels in the output image resulting from the user-selected transformation ordering and pixels in the output image resulting from the optimal transformation ordering. In an embodiment, the differences may only be apparent in pixels near the edges of the output images and not in pixels near the center. The differences may therefore be regarded as acceptable.

According to an embodiment of the invention, loss of fidelity may be minimized or eliminated through the use of alternate techniques. For example, the differences caused by swapping the order of a shrink transformation and a crop transformation may be accounted for by adjusting the parameters of the crop transformation. As described above, a pixel in the shrunken image may be a composite of several pixels in the original image. Pixels near the edge of an image that is shrunken after being cropped may be determined as a composite of fewer pixels than pixels near the edge of an image that is cropped after being shrunken. To account for this discrepancy and avoid a loss of fidelity, the crop transformation may be applied to a pixel range that is slightly larger than the range specified in the parameters associated with the crop transformation. In an embodiment, the slightly larger pixel range may encompass all of the pixels in the un-shrunken image that would influence the composite pixels in the shrunken image if the shrink transformation is applied before the crop transformation as specified in the user-selected transformation ordering. The pixels in the shrunken image that are in excess of those specified in the parameters associated with the crop transformation may be separately cropped out after the shrink transformation is applied to the slightly larger pixel range.

Figure 3:
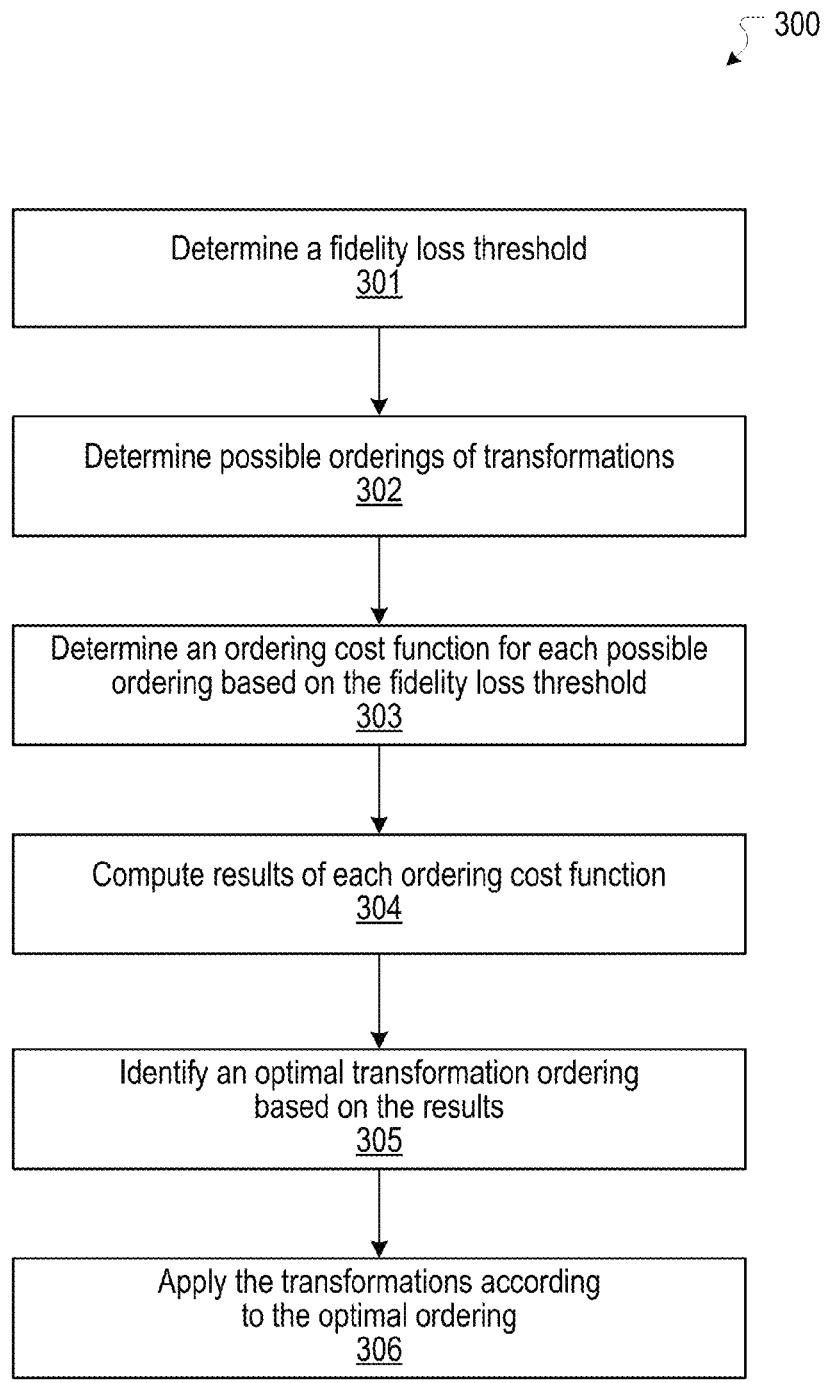
FIG. 3 illustrates a process for determining an optimal transformation ordering in accordance with an embodiment of the invention.

FIG. 3 illustrates a process 300 for determining an optimal transformation ordering in accordance with an embodiment of the invention. Initially, a user device 110 receives an original image from the social networking system 130. The user device 110 receives selections of transformations to be applied to the original image from a user. At block 301, a fidelity loss threshold is determined. The fidelity loss threshold may refer to an acceptable level of difference between an image produced by applying transformations according to an optimal ordering and an image produced by applying transformations according to a user-selected ordering. The fidelity loss threshold may be determined as a numerical value or as a binary value using predefined rules. The fidelity loss threshold may be specific to a region within the original image. Any technique for determining the fidelity loss threshold may be used.

At block 302, possible orderings of the transformations are determined. The possible orderings may refer to all possible permutations of the transformations. Alternatively, the possible orderings may exclude permutations that violate certain rules such as, for example, constraints that limit the sequences in which some transformations may be applied. Any technique for determining the possible orderings may be used. At block 303, an ordering cost function for each possible ordering is determined based on the fidelity loss threshold. The ordering cost functions may be determined by approximation, experimentation, or based on the hardware capabilities of the system on which the transformations are applied. Example techniques for determining the ordering cost functions are described further below. Any technique for determining the ordering cost functions may be used. At block 304, the results of each ordering cost function are computed. At block 305, the optimal transformation ordering is identified based on the results. The optimal transformation ordering may correspond to the ordering cost function with the smallest result. Any technique for identifying the optimal transformation ordering may be used. At block 306, the transformations are applied to the original image according to the optimal ordering. According to an embodiment, the process 300 may be entirely or partially performed by the image processing module 146, the image processing module 118, or other modules of the social networking system 130 or the user device 110.

An ordering cost function may be determined by calculating the cost of each transformation in the ordering. In order to determine the ordering cost functions, a transformation cost function may be determined for each transformation. The ordering cost functions and transformation cost functions may vary greatly in complexity and need not conform to a particular polynomial or other mathematical form. Because the optimal transformation ordering may be determined by comparing the numerical outputs of the ordering cost functions, analytical methods that may require consistency in the forms of the functions may be unnecessary. According to an embodiment of the invention, the transformation cost function of each transformation in an ordering may be based on the size of an input image and the parameters of the transformation. For a transformation that follows another transformation within an ordering—i.e., every transformation in the ordering except the first transformation—the input image may be the same as the output image of the transformation that immediately precedes it. Thus, determining the ordering cost function of a transformation ordering and the transformation cost function of an individual transformation may involve determining the size of the input image, the parameters, and the size of the output image for each transformation in the ordering.

For example, one common user-selected transformation sequence includes a rotation, followed by a crop, followed by a shrink. The transformation cost function $C_R$ of rotating an input image I by an angle a (which may be an integral multiple of 90 degrees) may be expressed as:

$$C_R(I,a) = \text{Width}(I) \times \text{Height}(I) \times C_P,$$

where Width(I) and Height(I) represent the dimensions of I and $C_P$ represents the cost of rotating a single pixel. If the rotation angle is 90 degrees or 270 degrees, an output image $O_1$ of the rotation may have dimensions:

$$\text{Width}(O_1) = \text{Height}(I) \text{ and } \text{Height}(O_1) = \text{Width}(I).$$

If the rotation angle is 0 degrees or 180 degrees, the output image $O_1$ may have dimensions:

$$\text{Width}(O_1)=\text{Width}(I) \text{ and } \text{Height}(O_1)=\text{Height}(I).$$

The crop transformation may take $O_1$ as its input image and generate an output image $O_2$. The transformation cost function $C_C$ of cropping a rectangle of width w and height h from within $O_1$ may be expressed as:

$$C_C(O_1,w,h)=w \times h \times C_P,$$

where $C_P$ represents the cost of cropping a single pixel, which may be the same as the cost of rotating a single pixel if both operations are effected by copying the pixel from the memory buffer of the input image to the memory buffer of the output image. The crop transformation produces the output image $O_2$ with dimensions:

$$\text{Width}(O_2)=w \text{ and } \text{Height}(O_2)=h.$$

The width w and height h may not be equivalent to Width($O_1$) and Height($O_1$), respectively, because the crop transformation may remove pixels and thereby reduce the size of the input image.

The shrink transformation may have an associated parameter specifying the ratio of an output image $O_3$ to the input image $O_2$. A ratio near 1 may indicate that $O_3$ and $O_2$ are similar in size and that the shrink transformation causes a small reduction. A ratio near 0 may indicate that $O_3$ is substantially smaller than $O_2$ and that the shrink transformation causes a significant reduction. The shrink transformation may be more complex than the crop transformation and the rotate transformation because it may involve the use of one or more downsampling filters. Downsampling refers to the process of reducing a sampling rate of an input signal to conform to a criterion. The choice of which downsampling filter to use may depend on the size of the ratio. Different downsampling filters may carry different computing costs. Some downsampling filters that incur minimal cost may compute each pixel in the output image $O_3$ as the average of a fixed subset of pixels in the input image $O_2$. Each pixel in the downsampled output image $O_3$ may correspond to a fixed subset of pixels in the input image $O_2$. The transformation cost function $C_S$ of the shrink transformation when performed using these filters may be represented as:

$$C_S(O_2,r)=(r \times \text{Width}(O_2)) \times (r \times \text{Height}(O_2)) \times C_A,$$

where r represents the ratio and $C_A$ represents the cost associated with each pixel produced in the output image $O_3$. Other downsampling filters that incur higher costs may take every single pixel in the input image $O_2$ into account in determining the pixels in the output image $O_3$. In these filters, the influence of a pixel in the input image in determining a pixel in the output image may be inversely proportional to the relative distance between the pixels. This approach may help avoid the appearance of aliasing artifacts (i.e., when pixels in the input image $O_2$ do not affect the output image $O_3$ at all, features visible in the input image $O_2$ may completely disappear in the output image $O_3$). The transformation cost function $C_S$ of the shrink transformation when performed using these filters may be represented as:

$$C_S(O_2,r)=\text{Width}(O_2) \times \text{Height}(O_2) \times C_F,$$

where $C_F$ represents a cost associated with each pixel of the input image $O_2$ processed while downsampling using such a filter F. The choice of filter may depend on the ratio parameter associated with the shrink transformation. For r near 1, an inexpensive filter may be fast and produce visually acceptable results. For r near 0, a costlier filter may need to be used to avoid significant fidelity loss. The transformation cost function $C_S$ of the shrink transformation may thus be represented for different values of r:

$$C_S(O_2,r)=(r \times \text{Width}(O_2)) \times (r \times \text{Height}(O_2)) \times C_A \text{ if } r>0.5,$$

$$C_S(O_2,r)=\text{Width}(O_2) \times \text{Height}(O_2) * C_F \text{ if } r \leq 0.5.$$

Upon determining the costs $C_R(I, a)$, $C_C(O_1, w, h)$, and $C_S(O_2, r)$ of the rotate transformation, the crop transformation, and the shrink transformation, respectively, the cost of the transformation ordering rotate-crop-shrink may be computed as the sum of the individual costs. For example, according to the transformation cost functions above, the total cost of starting with an input image I of size 100×200, then rotating it by 90 degrees, then cropping its central 100×50 region, and then shrinking it to 50×25 (a ratio of 0.5) may be represented as:

$$C_R(I, 90) = 100 \times 200 \times C_P$$
$$\text{Width}(O_1) = 200, \text{Height}(O_1) = 100$$
$$C_C(O_1, 100, 50) = 100 \times 50 \times C_P$$
$$\text{Width}(O_2) = 100, \text{Height}(O_2) = 50$$
$$C_S(O_2, 0.5) = 100 \times 50 \times C_F$$
$$\text{Total Cost} = C_R(I, 90) + C_C(O_1, 100, 50) + C_S(O_2, 0.5)$$
$$= (100 \times 200 \times C_P) + (100 \times 50 \times C_P) + (100 \times 50 \times C_F)$$
$$= 25000 \times C_P + 5000 \times C_F.$$

A transformation cost function may include a constant that represents the cost incurred in transforming a single pixel. For example, the transformation cost function $C_R(I, a)$ representing the cost of the rotate transformation above includes the constant $C_P$ representing the cost of rotating a single pixel. According to an embodiment of the invention, these per-pixel cost constants may be determined based on one-time experimentation, at run-time, using system analytics, or by any other technique. If the per-pixel cost constants are determined at run-time, they may take into account the capabilities and features of the hardware that will be used to apply the transformations. For example, if significant cost savings may be achieved by using a dedicated graphics processing unit (GPU) to apply certain transformations, these savings may be taken into account in determining the per-pixel cost constants if such a GPU is available. More generally, the whole cost function $C_R(I, a)$—or that of any other transformation—not just the value of the constant $C_P$, may change depending on the hardware. For example, if a GPU can process 1000 pixels at the same time, then $C_R(I, a)$ may have a fixed single value as long as the input image I has anywhere from 1 to 1000 pixels, a different but still fixed higher value if it has 1001 to 2000 pixels, etc. In other words, whether I has anywhere from 1 to 1000 pixels may not change the cost at all because the cost will be a single GPU processing cycle. This type of hardware dependency may not be captured by just changing $C_P$—the cost function itself may need to change form to allow for thresholds, in a manner similar to how the shrink cost function may change form depending on the value of the shrink ratio.

Figure 4:
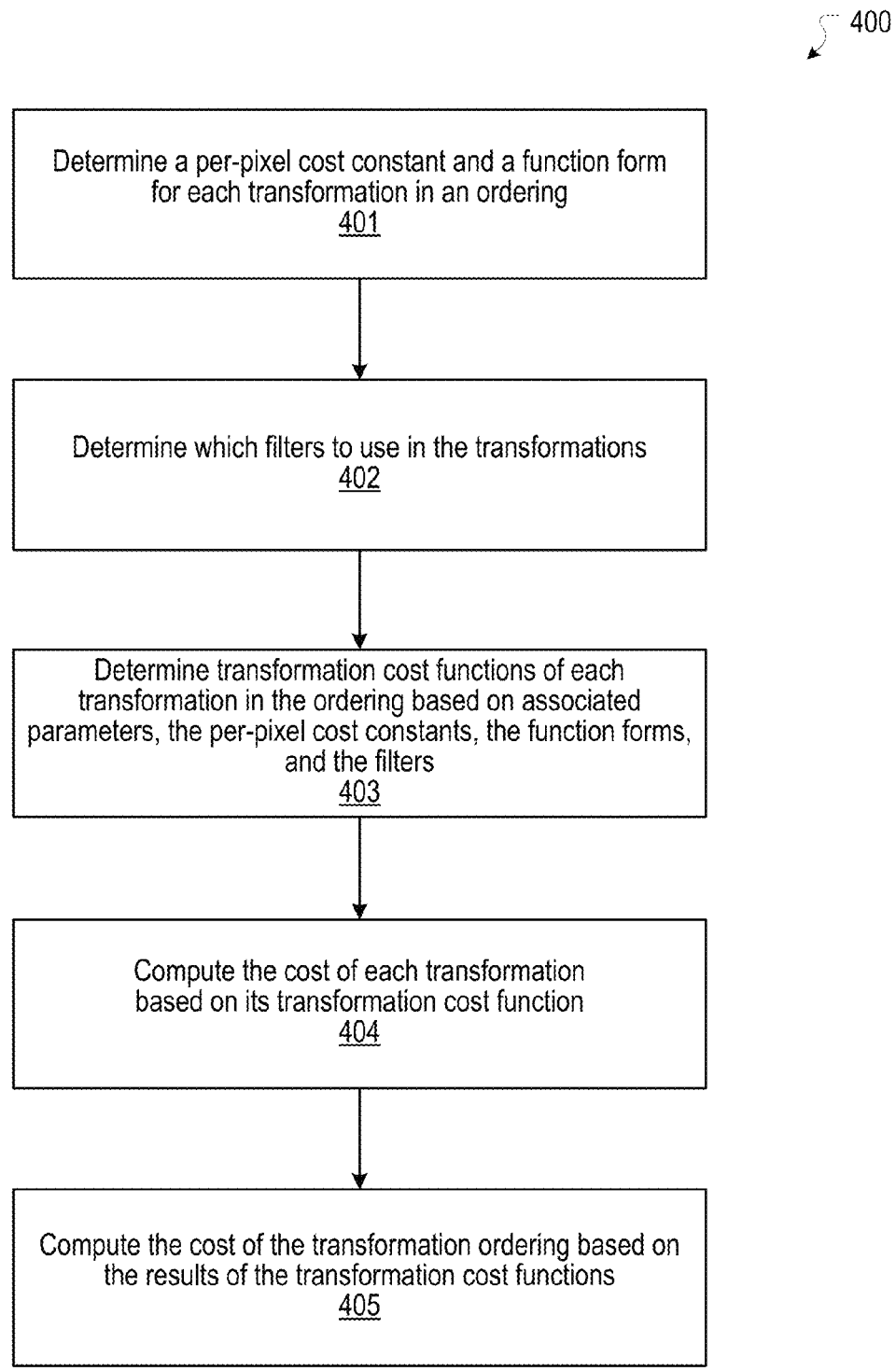
FIG. 4 illustrates a process for determining the cost of a transformation ordering in accordance with an embodiment of the invention.

FIG. 4 illustrates a process 400 for determining the cost of a transformation ordering in accordance with an embodiment of the invention. At block 401, a per-pixel cost constant and a function form (or, more generally, a cost function) are determined for each transformation in the ordering. According to an embodiment, just the per-pixel cost constant or the function form may be based on a fixed or predetermined value.

According to an embodiment, the per-pixel cost constant or the function form may be based on the capabilities of the hardware on which the transformations will be performed. Any technique for determining the per-pixel cost constants and the function forms may be used. At block 402, filters to be used in the transformations are determined. According to an embodiment, the filters may be determined based on the parameters of each transformation. According to an embodiment, the filters may be determined based on the capabilities of the hardware on which the transformations will be performed. Any technique for determining the filters may be used. At block 403, the transformation cost function of each transformation in the transformation ordering is determined based on the associated parameters, the per-pixel cost constants, the function forms, and the filters. At block 404, the cost of each transformation is computed based on its transformation cost function. At block 405, the cost of the transformation ordering is computed based on the results of the transformation cost functions. In an embodiment, the cost of the transformation ordering is the sum of the cost of each transformation in the ordering. The process 400 may be performed using a user-specified transformation ordering, an optimal transformation ordering, or any other transformation ordering. According to an embodiment, the process 400 may be entirely or partially performed by the image processing module 146, the image processing module 118, or other modules of the social networking system 130 or the user device 110.

A transformation may be applied differently based on the position of the transformation within an ordering. When a transformation that has associated parameters is re-ordered, the parameters may need to be modified to reflect the transformation's new position in an alternate ordering, so that the image produced by the alternate ordering reflects the user's intent. For example, if a user selects a rotate transformation to rotate an image 180 degrees followed by a crop transformation to crop out pixels in the upper left hand corner of the image, the parameters associated with the crop transformation may be specified based on where the pixels to be cropped are located after the imaged is rotated. But the rotate transformation and the crop transformation may be swapped in an alternate transformation ordering. Because cropping the image before rotating it changes the location of the pixels to be cropped, the parameters associated with the crop transformation as specified in the user-selected transformation ordering may no longer be accurate. Before the rotate transformation is applied, in the alternate transformation ordering, the area to be cropped may be located in the lower right hand corner of the image. Accordingly, the parameters associated with the crop transformation may need to be updated to reflect the new location of the pixels to be cropped.

According to an embodiment of the invention, using pairwise swaps to re-order the transformations in a transformation ordering may allow for the parameters associated with a transformation to be appropriately adjusted such that the image reflects the user's intent. In a pairwise swap, two transformations that are ordered consecutively are swapped. In an embodiment, any transformation ordering may be derived from any other transformation ordering by performing pairwise swaps. The parameters of each transformation may be adjusted to account for the swap by referring to heuristics that specify how the parameters of a particular transformation should be adjusted when the transformation is swapped with another particular transformation that immediately follows or precedes it. In an embodiment, the heuristics may be determined in advance and maintained in the social networking system 130 or the user device 110.

For example, a shrink transformation may be associated with height and width shrink ratio parameters, a crop transformation may be associated with crop dimension parameters, and a rotate transformation may be associated with a rotate angle parameter. A transformation ordering that includes a shrink (S) followed by a crop (C) followed by a rotate (R) may be derived from a user-selected transformation ordering that includes a rotate (R) followed by a crop (C) followed by a shrink (S) by performing three pairwise swaps:
1) S is swapped with C: RCS→RSC
2) S is swapped with R: RSC→SRC
3) C is swapped with R: SRC→SCR.

The parameters may be adjusted for one pairwise swap at a time by applying a heuristic that is specific to a type of swap. For pairwise swap 1), the height and width shrink ratio parameters associated with the shrink transformation may be unaffected. However, because the pairwise swap may result in the shrink transformation being applied before the crop transformation, the crop transformation may need to be applied to a smaller input image. To account for the decrease in the size of the input image, the crop dimension parameters may be multiplied by the shrink ratio parameter. For pairwise swap 2), the rotation angle parameter associated with the rotate transformation may be unaffected. However, because the pairwise swap may result in the shrink transformation being applied before the rotate transformation, the height shrink ratio parameter and the width shrink ratio parameter, if distinct, may need to be swapped if the rotation angle is 90 degrees or 270 degrees. If the rotation angle is 0 degrees or 180 degrees, then the height and width shrink ratio parameters may be unaffected. For pairwise swap 3), the rotation angle parameter associated with the rotate transformation may be unaffected. However, because the pairwise swap would result in the crop transformation being applied before the rotate transformation, the crop dimension parameters may need to be rotated by an angle equivalent to the inverse of the rotation angle parameter associated with the rotate transformation.

Figure 5:
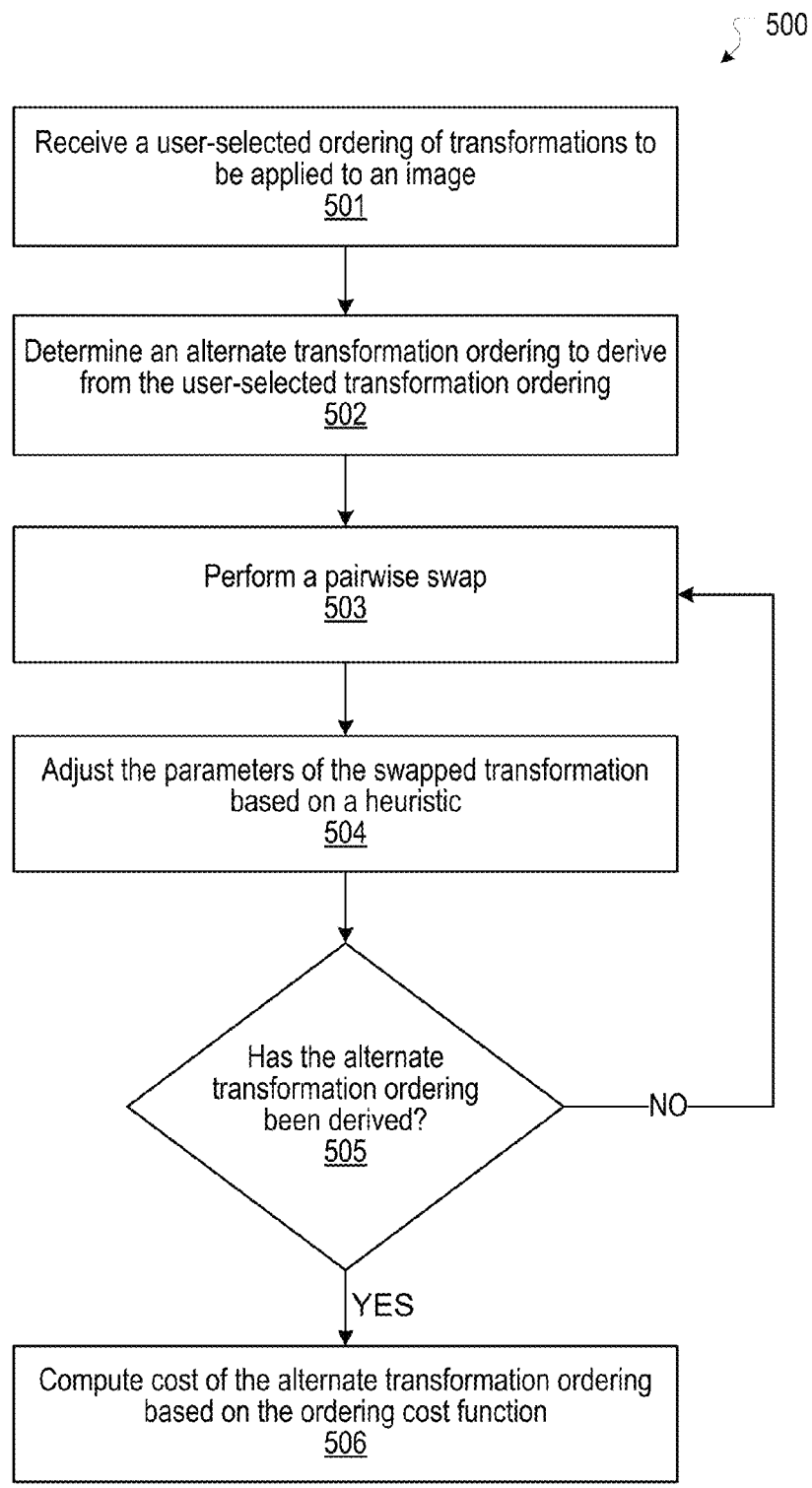
FIG. 5 illustrates a process for deriving one transformation ordering from another transformation ordering by performing pairwise swaps in accordance with an embodiment of the invention.

FIG. 5 illustrates a process 500 for deriving one transformation ordering from another transformation ordering by performing pairwise swaps in accordance with an embodiment of the invention. At block 501, a user-selected ordering of transformations to be applied to an image is received. At block 502, an alternate transformation ordering to derive from the user-selected transformation ordering is determined. According to an embodiment, the alternate transformation ordering may be an ordering from among the possible orderings of the transformations selected by the user. At block 503, a pairwise swap is performed. At block 504, the parameters of the swapped transformation are adjusted based on a heuristic. According to an embodiment, the heuristic may have been determined in advance and stored within the social networking system 130 or the user device 110. At block 505, it is determined if the alternate transformation ordering has been derived. If the alternate transformation ordering has been derived, then at block 506, the cost of the alternate transformation ordering is computed based on the ordering cost function. If the alternate transformation ordering has not been derived, then the process 500 returns to block 503 to perform an additional pairwise swap to derive the alternate transformation ordering. According to an embodiment, the process 500 may be entirely or partially performed by the image processing module 146, the image processing module 118, or other modules of the social networking system 130 or the user device 110.

According to an embodiment of the invention, transformation re-orderings derived using pairwise swaps may need to account for alternate techniques used to minimize or eliminate fidelity loss. As described above, fidelity loss caused by re-ordering transformations such as the shrink transformation may be avoided by using an alternate technique in applying the transformation. If an alternate technique for a shrink transformation is used to avoid fidelity loss, the alternate technique may need to be substituted for a standard shrink transformation technique in pairwise swaps involving the shrink transformation. For example, a shrink transformation and a crop transformation in a sequence SC may be swapped, and an alternate shrink technique $S_X$ may be substituted for the standard shrink technique S such that the sequence $CS_X$ may not be an entirely equivalent re-ordering of the sequence SC. In an embodiment, the alternate techniques may also be subject to the processes for determining the transformation cost functions and the ordering cost functions described herein.

According to an embodiment of the invention, the results of the transformation cost functions and ordering cost functions of transformation orderings may be dependent on the parameters associated with a transformation. In an embodiment, some ways of achieving significant cost savings in applying a transformation may be available only when the parameters associated with the transformation conform to certain constraints. Ways of achieving cost savings may include using certain techniques or hardware components that only accept specific types of inputs. For example, in an embodiment, the GPU may only be used to apply a crop transformation when each of the parameters associated with the crop transformation is a power of two. If each of the parameters associated with the crop transformation is not a power of two, the crop transformation may need to be applied using the central processing unit (CPU). Using the GPU to apply the crop transformation may be significantly less costly than using the CPU to apply the crop transformation. If the position of the crop transformation is not first in a user-selected transformation ordering but the crop transformation is associated with parameters that are a power of two, the user-selected transformation ordering may be less costly than an alternate transformation ordering in which the position of the crop transformation is first, if re-ordering the crop transformation requires adjusting the parameters such that they are no longer a power of two. In another example, a technique for compressing JPEG images that results in significant cost savings may only be available if the dimensions of the JPEG image are a power of 8 or 16. According to an embodiment, the availability of techniques or hardware components that result in significant cost savings may be reflected in the per-pixel cost constants used in the transformation cost functions and ordering cost functions, or in the form of the functions themselves.

According to an embodiment of the invention, certain transformation orderings may allow for transformations to be collapsed or combined. Collapsing transformations may refer to transformations that cancel each other out or have no net effect. For example, in a user-selected transformation ordering that includes a rotation by 270 degrees, a crop, and a rotation by 90 degrees, the rotate transformations may cancel each other out because the sum of their rotation angles is 360 degrees. The rotate transformations may be collapsed and removed from the possible transformation orderings. Similarly, in a user-selected transformation ordering, a crop transformation that specifies a larger range of pixels than the size of the input image may be collapsed, since it would have no effect on the input image. In an embodiment, collapsing transformations may be removed from a user-selected transformation ordering, assigned a cost of zero, or disregarded in the ordering cost functions. In another embodiment, overlapping crop transformations may be combined. In overlapping crop transformations, the pixel range specified in the parameters of one crop transformation may entirely or partially encompass the pixel range specified in the parameters of another crop transformation. Overlapping crop transformations may be combined, associated with parameters that include their region of overlap, and assigned an appropriate cost.

According to an embodiment of the invention, the procedure for determining the costs of the transformation orderings may be further optimized by using dynamic programming techniques. In an embodiment, if multiple transformation orderings begin with the same sequence of transformations, the cost of the sequence may be computed once and the result may be re-used for every transformation ordering that begins with the sequence. The cost of the sequence may also be reused in determining the cost of a transformation ordering that includes the sequence in the middle or at the end if the parameters of the first transformation in the sequence are not affected by the position of the sequence within the ordering. Similarly, some transformations or transformation sequences may have fixed costs. A fixed cost of a transformation may be cached and used in computing the cost of transformation orderings that include the transformation.

Hardware Implementation

Figure 6:
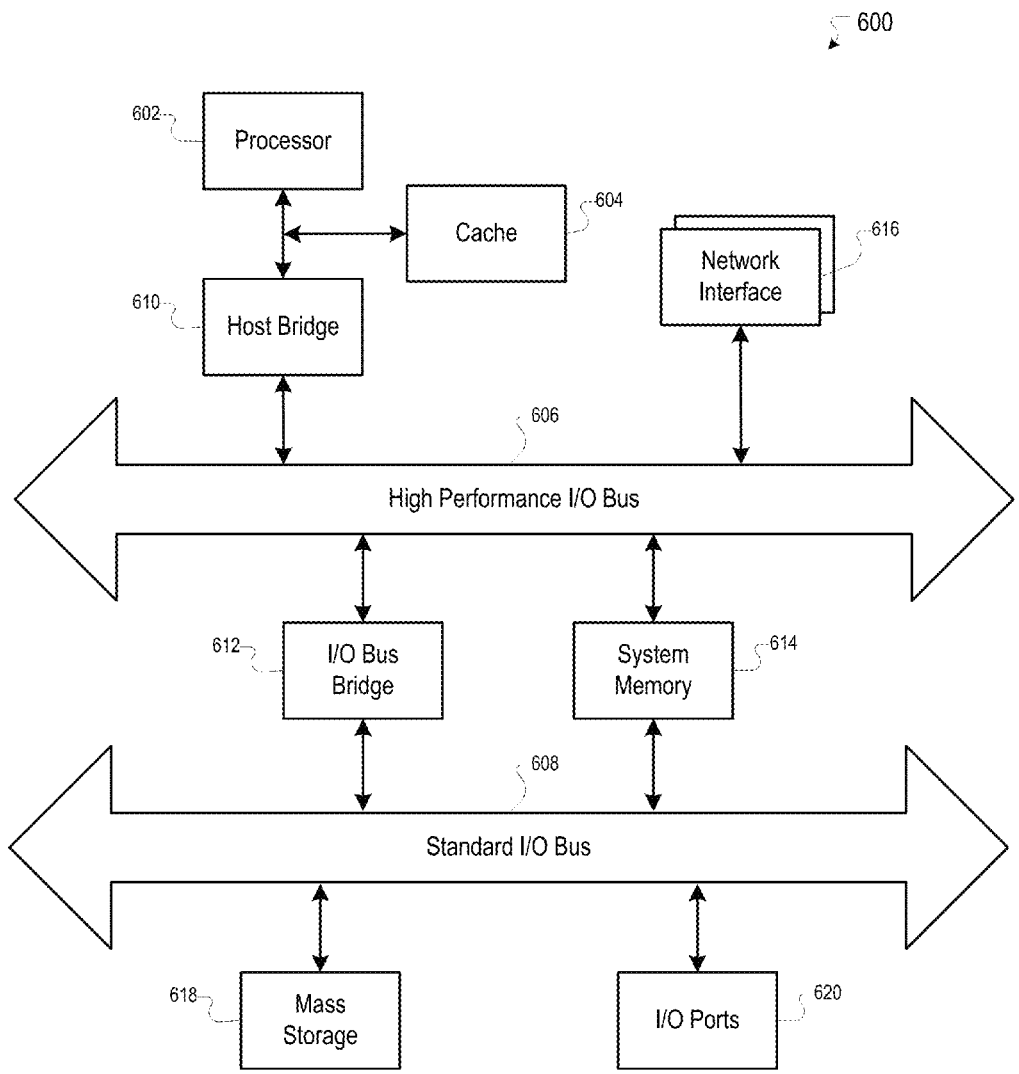
FIG. 6 illustrates a computer system that may be used to implement one or more of the embodiments described herein in accordance with an embodiment of the invention.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 130, the user device 110, and the external system 120, or a component thereof. In an embodiment of the invention, the computer system 600 may be one server among many that constitutes all or part of the social networking system 130.

The computer system 600 includes a processor 602, a cache 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer implemented method comprising:
applying, by a computer system, one or more ordering cost functions to each possible transformation ordering of a plurality of image transformations of a user-selected transformation ordering, each ordering cost function comprising a plurality of transformation cost functions, and each transformation cost function being associated with an image transformation and based on a per-pixel cost value;

determining, by the computer system, computing costs for each of the one or more applied ordering cost functions; and selecting, by the computer system, an optimal transformation ordering of the plurality of image transformations based on the determined computing costs.

2. The computer implemented method of claim 1, further comprising swapping a first transformation and a second transformation of the user-selected transformation ordering.

3. The computer implemented method of claim 2, further comprising adjusting at least one of a first parameter associated with the first transformation and a second parameter associated with the second transformation.

4. The computer implemented method of claim 3, wherein the adjusting the at least one of the first parameter associated with the first transformation and the second parameter associated with the second transformation is based on at least one heuristic.

5. The computer implemented method of claim 2, wherein the swapping the first transformation and the second transformation of the user-selected transformation ordering comprises substituting an alternate technique for at least one of the first transformation and the second transformation.

6. The computer implemented method of claim 1, wherein the at least one of the ordering cost functions is further based on a function form.

7. The computer implemented method of claim 6, wherein at least one of the per-pixel cost value and the function form is based on hardware capabilities.

8. The computer implemented method of claim 1, further comprising identifying collapsing transformations from the image transformations.

9. The computer implemented method of claim 1, further comprising identifying combining transformations from the image transformations.

10. The computer implemented method of claim 1, further comprising identifying a cost savings feature based on parameters associated with at least one of the image transformations, wherein at least one of the ordering cost functions is based on the cost savings feature.

11. The computer implemented method of claim 10, wherein the cost savings feature is based on use of a technique for executing at least one of the image transformations.

12. The computer implemented method of claim 10, wherein the cost savings feature is based on use of a hardware component.

13. The computer implemented method of claim 1, further comprising determining a fidelity loss threshold representing an acceptable level of difference between a first image resulting from the optimal transformation ordering and a second image resulting from the user-selected transformation ordering.

14. The computer implemented method of claim 13, wherein the selecting the optimal ordering transformation is based on satisfaction of the fidelity loss threshold.

15. The computer implemented method of claim 1, wherein the image transformations comprise at least one of a crop, a rotate, and a shrink.

16. The computer implemented method of claim 1, wherein the determining computing costs comprises:

determining at least one sequence cost for at least one sequence of the possible transformation orderings; and storing the at least one sequence cost.

17. The computer implemented method of claim 1, further comprising identifying at least one constraint associated with at least one of the image transformations of the user-selected transformation ordering, wherein the selecting an optimal transformation ordering is based on the at least one constraint.

18. A system comprising:
at least one processor; and
a memory storing instructions configured to instruct the at least one processor to perform:
applying, by a computer system, one or more ordering cost functions to each possible transformation ordering of a plurality of image transformations of a user-selected transformation ordering, each ordering cost function comprising a plurality of transformation cost functions, and each transformation cost function being associated with an image transformation and based on a per-pixel cost value;
determining computing costs for each of the one or more applied ordering cost functions; and
selecting an optimal transformation ordering of the plurality of user-selected image transformations based on the determined computing costs.

19. The system of claim 18, wherein the instructions are further configured to instruct the at least one processor to perform swapping a first transformation and a second transformation of the user-selected transformation ordering.

20. The system of claim 19, wherein the instructions are further configured to instruct the at least one processor to perform adjusting at least one of a first parameter associated with the first transformation and a second parameter associated with the second transformation.

21. The system of claim 20, wherein the adjusting the at least one of the first parameter associated with the first transformation and the second parameter associated with the second transformation is based on at least one heuristic.

22. The system of claim 19, wherein the swapping the first transformation and the second transformation of the user-selected transformation ordering comprises substituting an alternate technique for at least one of the first transformation and the second transformation.

23. The system of claim 18, wherein the at least one of the ordering cost functions is further based on a function form.

24. The system of claim 23, wherein at least one of the per-pixel cost value and the function form is based on hardware capabilities.

25. The system of claim 18, wherein the instructions are further configured to instruct the at least one processor to perform identifying collapsing transformations from the image transformations.

26. The system of claim 18, wherein the instructions are further configured to instruct the at least one processor to perform identifying combining transformations from the image transformations.

27. The system of claim 18, wherein the instructions are further configured to instruct the at least one processor to perform identifying a cost savings feature based on parameters associated with at least one of the image transformations, wherein at least one of the ordering cost functions is based on the cost savings feature.

28. The system of claim 27, wherein the cost savings feature is based on use of a technique for executing at least one of the image transformations.

29. The system of claim 27, wherein the cost savings feature is based on use of a hardware component.

30. The system of claim 18, wherein the instructions are further configured to instruct the at least one processor to perform determining a fidelity loss threshold representing an acceptable level of difference between a first image resulting from the optimal transformation ordering and a second image resulting from the user-selected transformation ordering.

31. The system of claim 30, wherein the selecting the optimal ordering transformation is based on satisfaction of the fidelity loss threshold.

32. The system of claim 18, wherein the image transformations comprise at least one of a crop, a rotate, and a shrink.

33. The system of claim 18, wherein the determining computing costs comprises:
 determining at least one sequence cost for at least one sequence of the possible transformation orderings; and
 storing the at least one sequence cost.

34. The system of claim 18, wherein the instructions are further configured to instruct the at least one processor to perform identifying at least one constraint associated with at least one of the image transformations of the user-selected transformation ordering, wherein the selecting an optimal transformation ordering is based on the at least one constraint.

35. A tangible, non-transitory computer storage medium storing computer-executable instructions that, when executed, cause a computer system to perform a computer-implemented method comprising:
 applying, by a computer system, one or more ordering cost functions to each possible transformation ordering of a plurality of image transformations of a user-selected transformation ordering, each ordering cost function comprising a plurality of transformation cost functions, and each transformation cost function being associated with an image transformation and based on a per-pixel cost value;
 determining computing costs for each of the one or more applied ordering cost functions; and
 selecting an optimal transformation ordering of the plurality of user-selected image transformations based on the determined computing costs.

36. The tangible, non-transitory computer storage medium of claim 35, wherein the instructions are further configured, when executed, to cause a computer system to perform swapping a first transformation and a second transformation of the user-selected transformation ordering.

37. The tangible, non-transitory computer storage medium of claim 36, wherein the instructions are further configured, when executed, to cause a computer system to perform adjusting at least one of a first parameter associated with the first transformation and a second parameter associated with the second transformation.

38. The tangible, non-transitory computer storage medium of claim 37, wherein the adjusting the at least one of the first parameter associated with the first transformation and the second parameter associated with the second transformation is based on at least one heuristic.

39. The tangible, non-transitory computer storage medium of claim 36, wherein the swapping the first transformation and the second transformation of the user-selected transformation ordering comprises substituting an alternate technique for at least one of the first transformation and the second transformation.

40. The tangible, non-transitory computer storage medium of claim 35, wherein the at least one of the ordering cost functions is further based on a function form.

41. The tangible, non-transitory computer storage medium of claim 40, wherein at least one of the per-pixel cost value and the function form is based on hardware capabilities.

42. The tangible, non-transitory computer storage medium of claim 35, wherein the instructions are further configured, when executed, to cause a computer system to perform identifying collapsing transformations from the image transformations.

43. The tangible, non-transitory computer storage medium of claim 35, wherein the instructions are further configured, when executed, to cause a computer system to perform identifying combining transformations from the image transformations.

44. The tangible, non-transitory computer storage medium of claim 35, wherein the instructions are further configured, when executed, to cause a computer system to perform identifying a cost savings feature based on parameters associated with at least one of the image transformations, wherein at least one of the ordering cost functions is based on the cost savings feature.

45. The tangible, non-transitory computer storage medium of claim 44, wherein the cost savings feature is based on use of a technique for executing at least one of the image transformations.

46. The tangible, non-transitory computer storage medium of claim 44, wherein the cost savings feature is based on use of a hardware component.

47. The tangible, non-transitory computer storage medium of claim 35, wherein the instructions are further configured, when executed, to cause a computer system to perform determining a fidelity loss threshold representing an acceptable level of difference between a first image resulting from the optimal transformation ordering and a second image resulting from the user-selected transformation ordering.

48. The tangible, non-transitory computer storage medium of claim 47, wherein the selecting the optimal ordering transformation is based on satisfaction of the fidelity loss threshold.

49. The tangible, non-transitory computer storage medium of claim 35, wherein the image transformations comprise at least one of a crop, a rotate, and a shrink.

50. The tangible, non-transitory computer storage medium of claim 35, wherein the determining computing costs comprises:
 determining at least one sequence cost for at least one sequence of the possible transformation orderings; and
 storing the at least one sequence cost.

51. tangible, non-transitory computer storage medium of claim 35, wherein the instructions are further configured, when executed, to cause a computer system to perform identifying at least one constraint associated with at least one of the image transformations of the user-selected transformation ordering, wherein the selecting an optimal transformation ordering is based on the at least one constraint.

* * * * *